US011930057B2

(12) United States Patent
Newton

(10) Patent No.: US 11,930,057 B2
(45) Date of Patent: *Mar. 12, 2024

(54) INTEGRATED SYSTEM AND METHOD FOR EXECUTING A COMMUNAL MEDIA SESSION WITH DUAL-VIEW SHARING

(71) Applicant: Groopview, Inc, Philadelphia, PA (US)

(72) Inventor: Delmond Newton, Philadelphia, PA (US)

(73) Assignee: GROOPVIEW, INC, Philadelphia, PA (US)

( * ) Notice: Subject to any disclaimer, the term of this patent is extended or adjusted under 35 U.S.C. 154(b) by 294 days.

This patent is subject to a terminal disclaimer.

(21) Appl. No.: 17/545,693

(22) Filed: Dec. 8, 2021

(65) Prior Publication Data

US 2022/0159048 A1    May 19, 2022

Related U.S. Application Data

(63) Continuation-in-part of application No. 17/533,474, filed on Nov. 23, 2021, now Pat. No. 11,722,543, and a continuation-in-part of application No. 17/221,886, filed on Apr. 5, 2021, now Pat. No. 11,558,441, said application No. 17/533,474 is a continuation-in-part (Continued)

(51) Int. Cl.
*H04L 65/61*    (2022.01)
*H04L 9/40*     (2022.01)
*H04N 5/262*    (2006.01)
*H04N 5/272*    (2006.01)

(Continued)

(52) U.S. Cl.
CPC .......... *H04L 65/61* (2022.05); *H04L 63/0876* (2013.01); *H04N 5/2624* (2013.01); *H04N 5/272* (2013.01); *H04N 5/76* (2013.01); *H04N 23/90* (2023.01)

(58) Field of Classification Search
CPC ............. H04L 65/4076; H04L 65/4084; H04L 65/403; H04L 65/601; H04L 65/602; H04N 21/4223; H04N 21/4307; H04N 21/43076

See application file for complete search history.

(56) References Cited

U.S. PATENT DOCUMENTS 7,827,208 B2 * 11/2010 Bosworth ............. G06F 16/955
                                                 707/802
9,282,068 B1 *  3/2016 Pan ....................... H04L 65/403
(Continued)

*Primary Examiner* — Kostas J Katsikis
(74) *Attorney, Agent, or Firm* — NEAL BLIBO LLC

(57) ABSTRACT

A method for delivering multimedia content during a communal session at a media system commutatively coupled with a streaming application. The method includes authenticating access to multimedia content for user devices participating in a communal session, receiving a first recording from a first user device, the first recording being generated from a first set of cameras of the first user device, receiving social media content generated the user devices, the social media content including a second recording generated simultaneously with the first recording on the first user device, the second recording being generated from a second set of cameras of the first user device, and synchronizing delivery of the first recording and the social media content by exchanging playback control messages with the streaming application to direct synchronized transmissions of the first recording and the social media content to the user devices.

16 Claims, 10 Drawing Sheets

Related U.S. Application Data of application No. 17/221,886, filed on Apr. 5, 2021, now Pat. No. 11,558,441, which is a continuation-in-part of application No. 16/951,404, filed on Nov. 18, 2020, now Pat. No. 11,388,215.

(51) Int. Cl.
*H04N 5/76* (2006.01)
*H04N 23/90* (2023.01)

(56) References Cited

U.S. PATENT DOCUMENTS

| | | | |
|---|---|---|---|
| 10,534,525 B1* | 1/2020 | Suchland | H04L 67/1097 |
| 2010/0274858 A1* | 10/2010 | Lindberg | G06F 9/452 |
| | | | 715/838 |
| 2013/0170818 A1* | 7/2013 | Klappert | G06Q 50/01 |
| | | | 386/299 |
| 2014/0362165 A1* | 12/2014 | Ackerman | H04N 7/152 |
| | | | 348/14.07 |
| 2015/0134737 A1* | 5/2015 | Albrecht | H04L 51/52 |
| | | | 709/204 |
| 2015/0220249 A1* | 8/2015 | Snibbe | H04L 67/10 |
| | | | 715/719 |
| 2015/0271546 A1* | 9/2015 | Kim | H04N 21/4788 |
| | | | 725/109 |
| 2017/0019198 A1* | 1/2017 | Rajapakse | H04H 20/18 |
| 2017/0273044 A1* | 9/2017 | Alsina | H04N 21/4788 |
| 2017/0331866 A1* | 11/2017 | Corbin | G06Q 50/01 |
| 2018/0007091 A1* | 1/2018 | Rajapakse | H04L 12/189 |
| 2018/0255114 A1* | 9/2018 | Dharmaji | G06F 16/435 |
| 2019/0171341 A1* | 6/2019 | Eubanks | H04N 21/43076 |
| 2019/0200072 A1* | 6/2019 | Camargo | H04N 21/2402 |
| 2020/0112450 A1* | 4/2020 | Chhabra | H04L 65/403 |
| 2020/0128060 A1* | 4/2020 | Han | H04L 65/765 |
| 2021/0232577 A1* | 7/2021 | Ogawa | G06V 40/174 |
| 2021/0234909 A1* | 7/2021 | Shortt | H04L 65/612 |
| 2021/0266621 A1* | 8/2021 | Marten | H04L 65/762 |
| 2021/0314521 A1* | 10/2021 | Olshansky | H04N 5/77 |
| 2021/0352359 A1* | 11/2021 | Barvo | H04N 21/2187 |

* cited by examiner

INTEGRATED SYSTEM AND METHOD FOR EXECUTING A COMMUNAL MEDIA SESSION WITH DUAL-VIEW SHARING

CROSS REFERENCE TO RELATED APPLICATION

The present application is a continuation-in-part of U.S. application Ser. No. 17/533,474 titled "An Integrated System and Method for Executing a Communal Media Session Across Multiple Platforms," filed Nov. 23, 2021, which is a continuation-in-part of U.S. application Ser. No. 17/221,886 titled "An Integrated System and Method for Executing a Communal Media System in a Streaming Application," filed Apr. 5, 2021, which is a continuation-in-part of U.S. application Ser. No. 16/951,404 titled "A Multilayer and Synchronized Communal Social Media System and Method," filed Nov. 18, 2020, which claims the benefit of U.S. Provisional application Ser. No. 16/872,704 titled "A Communal Social Media System and Method," filed May 12, 2020, which claims the benefit of U.S. Provisional Application Ser. No. 62/925,212 titled "Method For Viewing Online Content," filed Oct. 23, 2019, which claims the benefit of U.S. Provisional Application Ser. No. 62/749,298 titled "Method For Viewing Online Content," filed Oct. 23, 2018, all of which are incorporated by reference herein in their entirety.

BACKGROUND OF THE INVENTION

Individuals in different locations may watch the same video or other multimedia content using a streaming application, such as Netflix. The streaming application may be integrated with a video sharing application, for example, a Chrome tele-party extension, so that two or more individuals may stream and watch a video together in the streaming application during a communal session. However, these communal sessions are typically not fully synchronized due to the differences in the network configurations of the devices used to stream the multimedia content. For example, when multiple individuals are simultaneously streaming a video, there are likely to be different lag times on when the video is received on each user's device due to the differences in the configuration of each user's device/network, for example, the bandwidth associated with each user's network.

In addition to streaming video or other multimedia content during a communal session, individuals in different locations may also watch video or other multimedia content recorded on a device used in the communal session. The same problem of synchronization exists with streaming content recorded on a device used in the communal session. There is therefore a need for an improved system and method for allowing a streaming application to fully synchronize the content being recorded on one device and viewed on multiple devices during the streaming session, and for synchronizing the recorded content with social media content being transmitted across devices during the streaming session.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1:
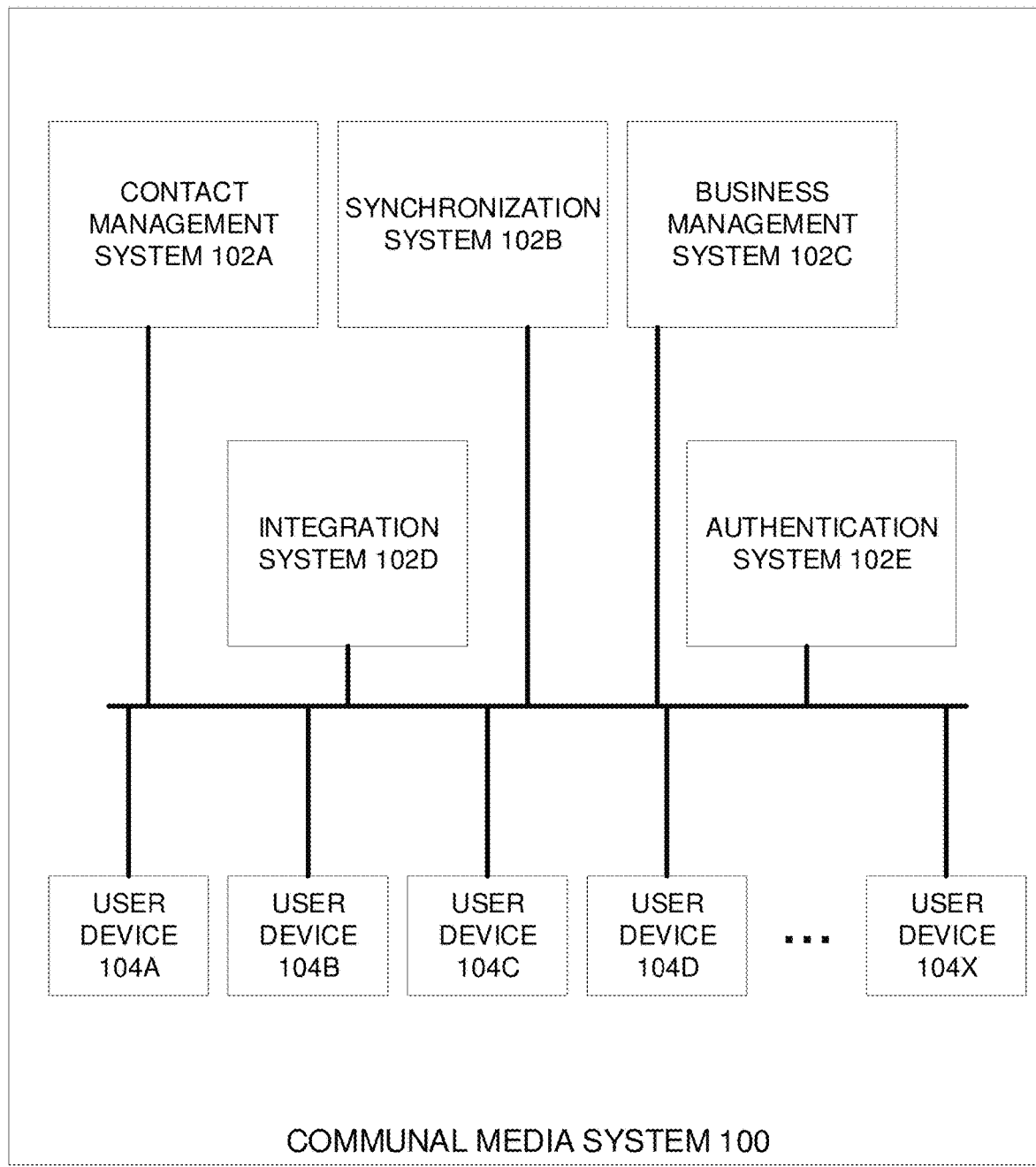
FIG. 1 is a block diagram of a communal media system used in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments are directed to a communal media system including an authentication system configured to authenticate access to multimedia content on a plurality of user devices participating in a communal session; an integration system configured to integrate and communicatively couple the communal media system with a streaming application; and a synchronization system. The synchronization system is configured to: receive a first recording from a first user device in the communal session, the first recording being generated from a first set of cameras of the first user device, to receive social media content generated on one or more of the plurality of user devices, the social media content including a second recording generated simultaneously with the first recording on the first user device, the second recording being generated from a second set of cameras of the first user device, to initiate video playback on a player in the streaming application, the player being configured to transmit the first recording and the social media content to each of the plurality of user devices, and to synchronize delivery of the first recording and the social media content, via the player, by exchanging playback control messages with the streaming application to direct synchronized transmissions of the first recording and the social media content from the player to each of the plurality of user devices, the first recording and the social media content being delivered to each of the plurality of user devices at a same time, without any noticeable lag time in delivery of the first recording and the social media content to each the plurality of user devices.

Some embodiments are directed to a communal media system including an authentication system configured to authenticate access to multimedia content on a plurality of user devices participating in a communal session; an integration system configured to integrate and communicatively couple the communal media system with a streaming application; and a synchronization system. The synchronization system is configured to: receive a first recording from a first user device in the communal session, the first recording being generated from a first set of cameras of the first user device, to receive social media content generated on one or more of the plurality of user devices, the social media content including a second recording generated simultaneously with the first recording on the first user device, the second recording being generated from a second set of cameras of the first user device, to initiate video playback on a player in the streaming application, the player being configured to transmit the first recording and the social media content to each of the plurality of user devices, and to synchronize simultaneous delivery of the first recording, via the player, to each of the plurality of user devices except the first user device, to synchronize the delivery of the first recording with the first recording received with the first user device, and to synchronize simultaneous delivery of the social media content, via the player, to each of the plurality of user devices, the first recording and the social media content being delivered to each of the plurality of user devices at a same time, without any noticeable lag time in delivery of the first recording and the social media content to each the plurality of user devices.

Some embodiments are directed to a method for delivering multimedia content during a communal session at a communal media system communicatively coupled with a streaming application. The method includes authenticating access to multimedia content for each of a plurality of user devices participating in a communal session; receiving a first recording from a first user device in the communal session, the first recording being generated from a first set of cameras of the first user device; receiving social media content generated on one or more of the plurality of user devices, the social media content including a second recording generated simultaneously with the first recording on the first user device, the second recording being generated from a second set of cameras of the first user device; and initiating video playback on a player in the streaming application, the player being configured to transmit the first recording and the social media content to each of the plurality of user devices. The method further includes synchronizing delivery of the first recording and the social media content, via the player, by exchanging playback control messages with the streaming application to direct synchronized transmissions of the first recording and the social media content from the player to user devices, the first recording and the social media content being delivered to the user devices at a same time, without any noticeable lag time in delivery of the first recording and the social media content to the user devices.

FIG. 1 is a block diagram of a communal media system used in accordance with some embodiments. Communal media system 100 is configured to integrate with a streaming application 402 (shown in further details in FIG. 4) to synchronize multimedia content being transmitted from streaming application 402 and simultaneously viewed on multiple devices (shown as, for example, user devices 104a-104x, referred to generally as user devices 104 or devices 104) during a communal session. Examples of streaming applications 402 may be, for example, HBO, Netflix, Hulu, Showtime, Verizon Fios, or other streaming applications including multimedia content that can be streamed to user devices. The multimedia content may be live or recorded multimedia content. Communal media system 100 is configured to synchronize delivery of the multimedia content transmitted from streaming application 402 with social media content generated on devices 104 during the communal session.

Communal media system 100 is configured to include one or more systems 102 (shown as, for example, a contact management system 102a, a synchronization system 102b, a business management system 102c, an integration system 102d, and an authentication system 102e), each of which may be in the same physical location as components on a single computing device or on different computing devices that are communicatively coupled. Systems 102 may also be in remote locations on different computing devices that are communicatively coupled. Systems 102 may include additional components (not shown for the sake of simplicity) that may be used to transmit information across communal media system 100.

Contact management system 102a is configured to manage invitations and notifications to user devices 104 participating in a communal session. Synchronization system 102b is configured to synchronize delivery of information to user devices 104 executing streaming application 402 during a communal session, such that each of the user devices 104 in the communal session can receive the same information at the same time. Business management system 102c is configured to analyze operations on communal system 100. Integration system 102d is configured to integrate and communicatively couple communal media system 100 with streaming application 402, such that messages generated on communal media system 100 can be transmitted to streaming application 402, and vice versa. In an embodiment, when communal media system 100 is integrated with a streaming application, communal media system 100 may be executed within streaming application 402 and may operate as a component of streaming application 402. In some embodiments, communal media system 100, integrated with a streaming application, may be executed external from streaming application 402 but may be communicatively coupled to streaming application 402. Authentication system 102e is configured to authenticate access to subscription content for users participating in a communal session across one or more service platforms. For example, authentication system 102e may authenticate access to the subscription content for users participating in a communal session even if access for participants in the communal session is provided through two or more service platforms.

Streaming application 402 is configured to communicate with multiple user devices 104 that are communicatively coupled to each other and with streaming application 402 and communal media system 100. User devices 104 may be stationary devices such as desktops, personal computers, or gaming devices; mobile devices such as mobile phones or tablets; or other computing devices that can be used for viewing multimedia content and interacting with social media applications. Each user device 104 may be independently configured. For example, user device 104a may be configured to operate on the iOS platform and on a 5G network having a first set of specifications, user device 104b may be configured to operate on the Android platform on a 5G network having a second set of specifications, user device 104*c* may be configured to operate on the iOS platform and on a 4G network having a first set of specifications, and user device 104*d* may be configured to operate on the iOS platform and on a 4G network having a third set of specifications, where the first, second and third specifications may be different. Despite the differences in the configurations of user devices 104, communal media system 100 is configured to synchronize simultaneous delivery of multimedia content transmitted from streaming application 402 and/or from user devices 104 and other social media content generated on user devices 104, such that each user device 104 receives the multimedia and social media content at the same time during a communal session.

At an initial period, each user device 104*a*-104*x* is configured to download and install streaming application 402 from, for example, a mobile app store or the Internet. After installing streaming application 402 on each user device 104, a user device (for example, device 104*a*) may register with and log-in, by entering authentication/subscription credentials, into streaming application 402 to stream multimedia content from streaming application 402. User device 104*a* may then select content from streaming application 402. In some embodiments, the content selected by user device 104*a* may require a subscription and user device 104*a* may have access to the subscription content based on subscription credentials entered into streaming application 402. For example, if streaming application 402 is an HBO application, user device 104*a* may access HBO subscription content based on the subscription credentials device 104*a* entered into the HBO application. In this case, when user device 104*a* signs into streaming application 402, user device 104*a* may be granted access to the selected subscription content.

If the content selected by the user of device 104*a* is subscription content that is accessible to the user based on a subscription with an external service provider, the user of device 104*a* may be prompted to select or otherwise provide the name or other information of the external service provider with whom the user of device 104*a* has a subscription for the selected content. In some embodiments, user device 104*a* may also be prompted to provide authentication credentials for accessing the selected content through the external service provider. Consider an example where user device 104*a* is using Netflix as the streaming application 402 and the user of device 104*a* selects subscription content from HBO. If streaming application 402 determines that the user of device 104*a* does not have access to HBO through its Netflix subscription, user device 104*a* may be prompted to select an external service provider through which the user of device 104*a* has access to HBO. For example, user device 104 may select Comcast as the external service provider through which the user of device 104*a* has access to HBO and may provide the user of device 104*a* authentication credentials for Comcast.

Authentication system 102*e* may authenticate the user of device 104*a* by transmitting the authentication credentials transmitted from user device 104*a* to an external authentication server, wherein the external authentication server may authenticate and validate entitlements for the user of device 104*a*. For example, the external authentication server may authenticate that the user of device 104*a* is a subscriber of the selected service provider (in this example, Comcast) and validate that the user of device 104*a* is entitled to access to the selected subscription content (in this example, HBO content) based on the Comcast subscription information provided by user device 104*a*. Alternatively, authentication system 102*e* may authenticate and validate entitlements for the user of device 104*a* directly with the selected service provider. Authentication system 102*e* may obtain confirmation of the authentication and entitlements from the service provider or the external authentication server. If authentication system 102*e* is unable to authenticate and validate entitlements of user device 104*a*, authentication system 102*e* may provide an option for the user of device 104*a* to purchase a subscription to the selected content.

The user of device 104*a* may also elect to participate in a communal session, wherein the selected content is streamed to user device 104*a* and to other user devices 104*b*-104*x* selected by the user of device 104*a* to participate in the communal session. To initiate a communal session, a host device, i.e., user device 104*a* that initiated the communal session after selecting content from streaming application 402, may select a communal session feature provided in streaming application 402. After selecting the communal session feature, streaming application 402 initiates communal media system 100, wherein in cooperation with streaming application 402, communal media system 100 is configured to execute the communal session.

In the example where host device 104*a* selects the communal session feature to start a communal session, the user of device 104*a* may select, via device 104*a*, participants for the communal session. For example, the user of device 104*a* may select the participants for the communal session by entering identifying information such as an email or phone number for each participant or by selecting the participants from a list provided by streaming application 402. If the user of device 104*a* selects users of devices 104*b*-104*d* as participants of the communal session, the content selected by device 104*a* may be shared/viewed on devices 104*a*-104*d* in a communal setting at an appointed time.

When communal media system 100 is initiated, contact management system 102*a*, via integration system 102*d*, may retrieve the contact information associated with devices 104*b*-104*d* from streaming application 402. For example, contact management system 102*a* may retrieve the email or telephone number associated with devices 104*b*-104*d* from streaming application 402. Contact management system 102*a* may thereafter send invitations and notification, through integration system 102*d*, to devices 104*b*-104*d* for the users of devices 104*a*-104*d* to participate in the communal session at the appointed time. Integration system 102*d* may send the invitations directly to user devices 104*b*-104*d* or send the invitations via streaming application 402. Each of the users of devices 104*b*-104*d* may accept or reject the invitation, via the respective devices 104*b*-104*d*.

When the communal session is initiated and each of devices 104*b*-104*d* accepts the invitation, authentication system 102*e* may provide a list of service providers to each of devices 104*b*-104*d*. Each of devices 104*b*-104*d* may be used to select or otherwise enter an external service provider with whom the associated user has a subscription that allows access to the content selected by host device 104*a*. Each of devices 104*b*-104*d* may provide authentication credentials associated with the selected service provider to authentication system 102*e*. Authentication system 102*e* may obtain a first validation for users of each of devices 104*b*-104*d* by transmitting the authentication credentials transmitted from each device 104*b*-104*d* to the external authentication server. The external authentication server uses the authentication credential to authenticate that the user of each device 104*b*-104*d* providing the authentication credentials is a subscriber of the service platform selected by device 104*b*-104*d* and validates that the user of each device 104*b*-104*d* is entitled to access to the subscription content selected by host device

104*a*. Alternatively, authentication system 102*e* may obtain the first validation for the user of each device 104*b*-104*d* by directly authenticating the credentials provided by each device 104*b*-104*d* with the service platform selected by user device 104*b*-104*d* and by obtaining confirmation from the service provider that the user is entitled to access to the subscription content selected by host device 104*a*. If authentication system 102*e* is unable to obtain the first validation for any of user devices 104*b*-104*d*, authentication system 102*e* may provide, to that user device 104*b*-104*d*, an option to purchase a subscription to the content selected by host device 104*a*.

If host device 104*a* selects a future time as the appointed time for activating the communal session such that the appointed time is later than an initiation period when the communal session was initiated, authentication system 102*e* may obtain a second validation, for users of each of devices 104*a*-104*d*, from the external authentication server or the service platform at the appointed time, wherein the second validation is an indication that each device 104*a*-104*d* still has access to view the selected content at the appointed time.

When necessary, authentication system 102*e* may provide access to subscriptions to the platform offering the selected content to one or more user devices 104*a*-104*d* and is configured to receive payments for the subscription from one or more user devices 104*a*-104*d*. For example, if a user of device 104*d* does not have a subscription for accessing the platform offering the selected content, either directly or through a service provider, authentication system 102*e* may provide access to a subscription to user device 104*d* and is configured to receive payments for the subscription from the user device 104*d*.

In some embodiments, authentication system 102*e* may provide access to subscription to the selected content to one or more user devices 104*a*-104*d* and is configured to receive payments for access to the selected content from one or more user devices 104*a*-104*d*. For example, if a user of device 104*d* does not have a subscription to access the content, either directly or through a service provider, authentication system 102*e* may provide access to the content to the user of device 104*d* and is configured to receive payment for access to the content from the device needing such access.

In some embodiments, authentication system 102*e* may receive payment from a first device for access to the selected content by a second device. Consider an example where the user of device 104*b* does not have access to the selected content. Authentication system 102*e* may receive payment from device 104*a*, wherein the payment from device 104*a* is for device 104*b* to access the selected content.

Once the confirmation from the content owner or distributor for the authentication credential sent from each device 104*a*-104*d* is obtained, communal media system 100 may obtain decryption keys for the content from a digital rights management (DRM) system. Communal media system 100 may then present the decrypted information to user devices 104*a*-104*d* for communal viewing.

Once authenticated at the appointed time, integration system 102*d* may obtain an address of each user device 104*a*-104*d* running streaming application 402 and participating in the communal session. The address may be an internet protocol (IP) addresses, a device identifier, an email address, a telephone number, or other information that uniquely identifies device 104*a*-104*d*.

Prior to starting the communal session, synchronization system 102*b* is configured to capture system configuration information from each user device 104*a*-104*b* and determine if the configuration on the user device meets a predetermined threshold. For example, synchronization system 102*b* may determine if the bandwidth available for each user device 104*a*-104*b* is above a predetermined minimum bandwidth threshold. If synchronization system 102*b* determines that the bandwidth for a user device is below the predetermined minimum bandwidth threshold, synchronization system 102*b* may determine that the device with bandwidth below the minimum bandwidth threshold cannot be supported and will prevent the device from participating in the communal media session. If synchronization system 102*b* determines that the bandwidth of a user device 104 is at or above the predetermined threshold, synchronization system 102*b* may allow the user of that device to participate in the communal media session.

Consider, for example, that synchronization system 102*b* is configured evaluate the network/device configuration of each user device 104*a*-104*b*. Synchronization system 102*b* may obtain the device configuration, location, network carrier, and/or the network type (for example, Wi-Fi, LTE, 5G) of each user device 104*a*-104*d*. Synchronization system 102*b* may also determine the minimum network bandwidth required for a communal session. For example, if synchronization system 102*b* determines that user device 104*a* has a bandwidth of 100 Mbps, user device 104*b* has a bandwidth of 75 Mbps, user device 104*c* has a bandwidth of 100 Mbps, and user device 104*d* has a bandwidth of 25 Mbps, synchronization system 102*b* may determine that the minimum network bandwidth on user devices 104-104*d* is 25 Mbps. If synchronization system 102*b* determines that the minimum required network bandwidth is below 25 Mbps, synchronization system 102*b* may determine that all of user devices 104-104*d* meet the network criteria for participating in communal media sessions. Synchronization system 102*b* may also test the speed of each user device 104*a*-104*d* and store the information for each user device 104*a*-104*d* along with a timestamp.

In an embodiment, at the start of the communal session, integration system 102*d* is configured to request that each user device 104*a*-104*d* activates one or more cameras on the user device. When the cameras on devices 104*a*-104*d* are activated, integration system 102*d* is configured to initiate a video chat session, such that the video chat session is initiated and overlaid on top of or presented next to the video rendered by the streaming application 402. Integration system 102*d* is further configured to receive the source location information for the content selected by host device 104*a* from streaming application 402 and to transmit the source location information to a video player 404 in streaming application 402, wherein video player 404 is configured to transmit the selected content to each user device 104*a*-104*d*. The source location information may be encrypted or non-encrypted information. In some embodiments, the source location information may be obtained from host device 104*a*, wherein the source location is based on subscription content accessed by host device 104*a*. In an embodiment, the source location information may be obtained based on subscription content accessed from one of device 104*b*-104*d* selected by host device 104*a*.

Synchronization system 102*b* is configured to initiate, via the video player 404, video playback on each user device 104*a*-104*d* and to synchronize the simultaneous delivery of multimedia content transmitted from video player 404 to user devices 104*a*-104*d*, such that each user device 104*a*-104*d* receives and displays the delivered content at the same time with no noticeable delivery lag, as though each user device is a single device in the same location.

In addition to or as an alternative to overlaying the video chat captured from cameras on user devices 104a-104d over content selected by the host device, integration system 102d is also configured to receive live video recordings from one or more cameras on one of devices 104a-104d in the communal session. For example, integration system 102d is configured to receive live video recordings from a front and/or rear cameras of device 104b in the communal session and to transmit the captured video to video player 404 in streaming application 402, wherein video player 404 is configured to simultaneously transmit the live video recording to each user device 104a-104d. As such, the multimedia content being watched in the communal session is the live video recording from device 104b. Synchronization system 102b is configured to synchronize the simultaneous delivery, via video player 404, of live videos captured from the forward and/or rear cameras on user device 104b, such that each user device 104a-104d receives the live video from video player 404 at the same time with no noticeable delivery lag.

In some embodiments, synchronization system 102b is further configured to synchronize the simultaneous delivery, via video player 404, of live videos captured from camera(s) on device 104b, wherein video player 404 sends the live videos to those devices not creating the live video (i.e., user devices 104a, 104c and 104d). Synchronization system 102b is configured to synchronize the live videos delivered to devices 104a, 104c and 104d with the video received from device 104b such that devices 104a-104d are viewing the live video at the same time with no noticeable delivery lag.

Synchronization system 102b is further configured to simultaneously transmit, via video player 404, video chats, texts, emotive responses, and other social media content generated on one of the devices 104a-104d, wherein the social media content is overlaid on or presented next to the multimedia content (i.e., the content selected by the host device and/or the live video recording from one of devices 104a-104d). Using the example above, while device 104b is capturing a video that is shared in the communal session (with, for example, one or more of its front cameras), other social media content may be simultaneously generated on device 104b, including an image, selfie, or video chat captured simultaneously with, for example, one or more rear cameras on device 104b. As such, device 104 may simultaneously employ two sets of cameras, where one set of the cameras is used for recording the video that is shared in a communal session and one set of the cameras is used for recording social media content. The user of device 104b may therefore be able to view a communal session including the live recording of what is being recorded on device 104b with devices 104a, 104c and 104d, with other social media interactions, including the selfie recorded on device 104b, at the same time. This capability, known as dual camera sharing or dual-view sharing, helps the user of device 104b replicate an in-person viewing experience, as shown in FIG. 5.

Synchronization system 102b may ensure that the live and/or recorded multimedia and social media content is synchronized on user devices 104a-104d by exchanging control messages with streaming application 402. As the media is played in devices 104a-104d, video player 404 may continuously send timestamp receipts and frame identifier acknowledgments of media fragment being played on each device 104a-104d to synchronization system 102b, wherein synchronization system 102b uses the timestamp receipts and frame identifier acknowledgments to synchronize delivery of content across devices 104a-104d.

When a communal session concludes, video player 404 transmits a completion message to integrated system 102a. Communal media system 100 then closes the video chat session and transfers control to streaming application 402. Business management system 102c may then obtain and/or analyze data associated with the session.

In an embodiment, a user associated with a device 104a-104d may create a profile photo of the user, record an image of the user, or create an avatar that is configured to represent an image of the user, wherein the avatar may mimic the user's actions, including speaking and other actions performed by the user. The avatar or other images of users associated with devices 104a-104d, video chats, texts, emotive responses, and other social media features generated on devices 104a-104d may be overlaid on the delivered multimedia content (i.e., live or pre-recorded content selected by a host device or live recordings by a device in the communal session) during the communal session. This enables the users of devices 104a-104d to view the multimedia content and social media interactions at the same time, without any noticeable lag time associated with receipt of the multimedia and social media content at user devices 104a-104d. Other content such as targeted advertisement and recommendations based on previous usage on one or more user device 104a-104d may also be overlaid on the delivered multimedia content.

In an embodiment, the host device may pause, rewind, or fast forward the multimedia content, wherein synchronization system 102b is also configured to ensure that the pause, rewind, or fast forward action is synchronized across all user devices.

In an embodiment, the host may make the communal session live to the public by activating a live button on the user interface. Once the session is live, users of other devices, for example, devices 104e-104x that are accessing communal media system 100 may view and participate in the session by sending video chat, texts, emotive responses, and other social media features generated on those uses devices 104e-104x. The live session may have a ticker counter to identify how may users are participating in the live session and devices 104e-104x may view the ticker counter. This may allow users of devices 104e-104x to follow created channels to see what sessions are live and broadcasting in real time and to join these sessions with limited abilities.

In some embodiments, a thumbnail image of the selected content may be provided in communal media system 100. Users of devices 104a-104d may manipulate the thumbnail images by, for example, moving, resizing, or deleting the image on the user interface.

Figure 2:
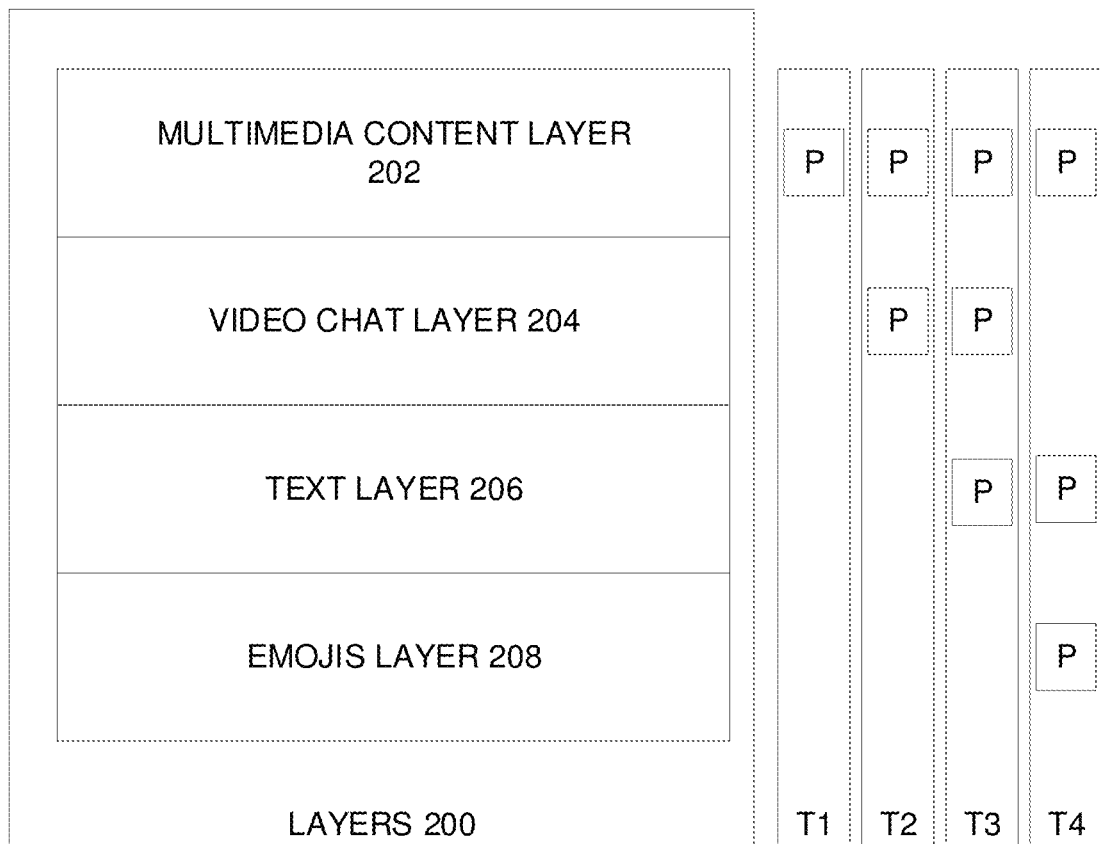
FIG. 2 is a block diagram of how packets are structured and delivered in the communal media system in accordance with some embodiments.

FIG. 2 is a block diagram of how packets are structured and delivered in the communal media system 100 in accordance with some embodiments. Synchronization system 102b is configured to separate content transmitted over communal media system 100 into multiple layers 200 and to synchronize delivery of the multiple layers to user devices 104a-104d, i.e., those user devices registered to participate in the session on communal media system 100. For example, synchronization system 102b may configure the multimedia content selected from streaming application 402 or video recording generated on a device in the communal session in a multimedia content layer 202, video chats received from user devices 104a-104d in a video chat layer 204, texts received from user devices 104a-104d in a text layer 206, and emojis received from user devices 104a-104d in an emojis layer 204. It should be apparent that synchronization system 102*b* may separate content transmitted over communal media system 100 into more or fewer layers than layers 202-208.

After separating the content into layers 200, synchronization system 102*b* may prioritize delivery of packets. For example, packets in multimedia content layer 202 may have a first priority, packets in video chat layer 204 may have a second priority, packets in text layer 206 may have a third priority, and packets in emojis layer 204 may have a fourth priority. Synchronization system 102*b* is also configured to synchronize voice and video packets in video streams in multimedia content layer 202 and voice and video packets in video chat layer 204 so that there is no lag time between the voice and the video packets in each layer. As such, synchronization system 102*b* is configured to synchronize delivery of packets in the same layer and delivery of multiple layers of content across disparate devices and disparate access networks so that all user devices 104*a*-104*d* may receive content delivered over communal media system 100 at the same time.

Consider, for example, that synchronization system 102*b* has packets (P) in different layers that are to be delivered at times T1-T4, as shown in FIG. 2. At T1, the packets in multimedia content layer 202 are delivered first. At T2, the packets in multimedia content layer 202 are delivered before the packets in video chat layer 204. At T3, the packets in multimedia content layer 202 are delivered first, the packets in video chat layer 204 are delivered second, and the packets in text layer 206 are delivered last. At T4, the packets in multimedia content layer 202 are delivered first, the packets in text layer 206 are delivered second, and the packets in emoji layer 208 are delivered last.

Figure 3:
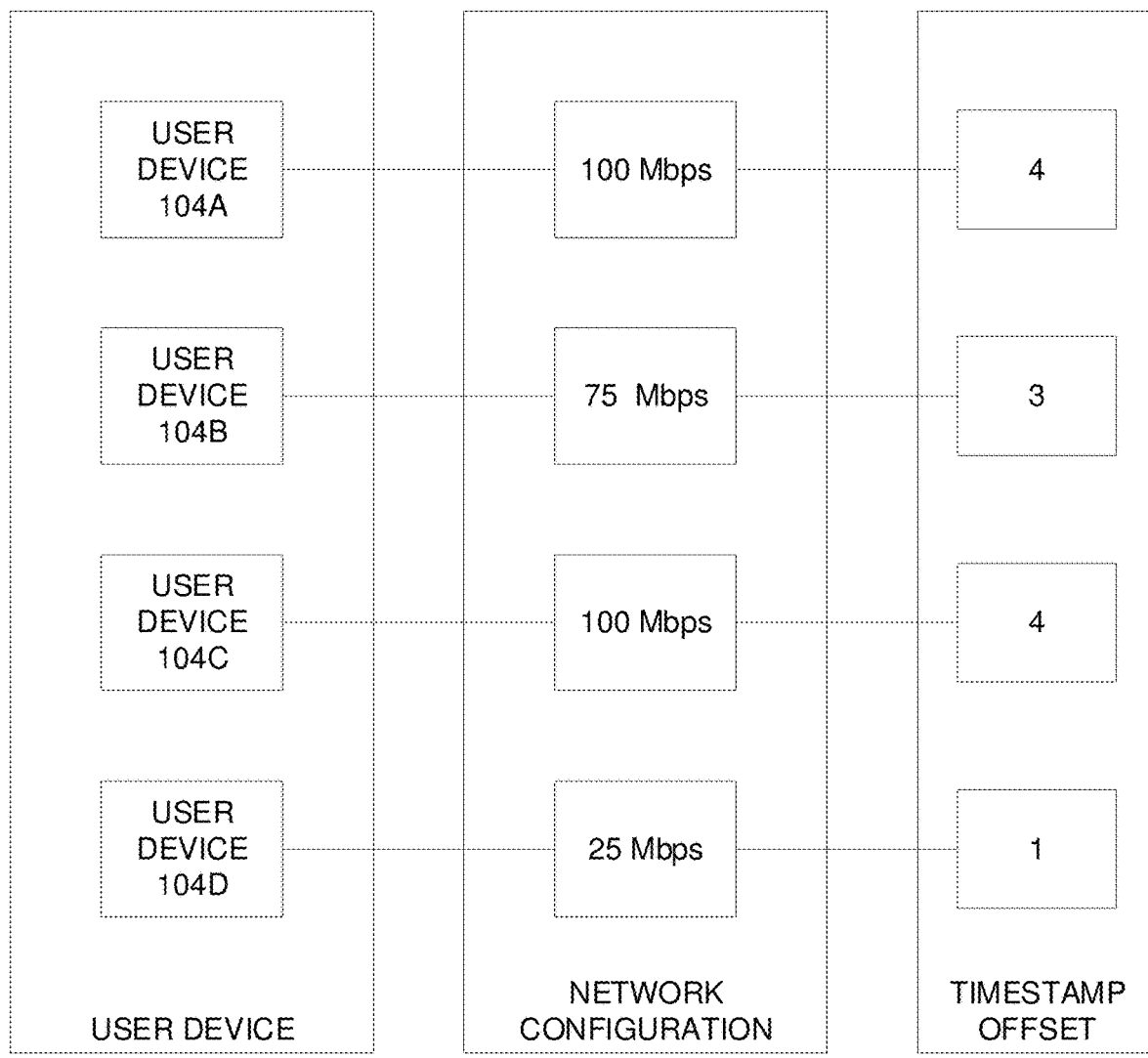
FIG. 3 is a block diagram of a timestamp structure used in accordance with some embodiments.

FIG. 3 is a block diagram of a timestamp structure used in accordance with some embodiments. When content is being transmitted over communal media system 100, at pre-determined time intervals during the session, synchronization system 102*b* is configured to continuously receive timestamp receipts from each user device 104*a*-104*d*. The timestamp receipts include timestamps of when a predefined number of packets is received by a user device. and timestamps of when a predefined number of packets is sent from the device. The interval for delivering and/or receiving timestamp receipts may be static or dynamic Static delivery may involve delivering and/or receiving timestamp receipts at predefined intervals (e.g., every 100 mms) and dynamic delivery may involve adapting delivery and/or receipt of timestamp receipts according to the various speeds of the heterogenous networks of user devices 104*a*-104*d*.

Synchronization system 102*b* may determine a timestamp offset for each user device 104*a*-104*d* and for each type/layer of content (video stream, video chat, text and emojis) delivered. In some embodiments, the timestamp offset may be based on a predetermined minimum network configuration and/or the timestamp receipts, wherein synchronization system 102*b* may adjust packet deliveries to correspond with the timestamp offset of each user device 104*a*-104*d*. Continuing with the example where user device 104*a* has a bandwidth of 100 Mbps, user device 104*a* has a bandwidth of 75 Mbps, user device 104*a* has a bandwidth of 100 Mbps, and user device 104*a* has a bandwidth of 25 Mbps, synchronization system 102*b* may set the timestamp offset for user devices 104*a*-104*d* based on the lowest bandwidth, as shown in FIG. 3. Accordingly, the timestamp offsets for user device 104*a* and 104*c* are set to four times the timestamp offset of user device 104*d* and the timestamp offset for user device 104*b* is set to three times the timestamp offset of user device 104*d*, This ensures that when packets are delivered using the timestamp offsets, synchronization system 102*b* can normalize the delivery of packets to all user devices 104*a*-104*d* (i.e., take care of propagation delays or speed up delivery based on the bandwidth). In this manner, all user devices 104*a*-104*d* will receive multimedia and social media contents at the same time and without any noticeable delay in receipt of the content among the devices, ensuring that users of devices 104*a*-104*d* are viewing and interacting with the content as if they were in the same physical location and viewing the content on the same device.

In addition to sending and receiving timestamp receipts to and from devices 104*a*-104*d*, synchronization system 102*b* may also send and/or receive information associated with frame and/or fragment of the multimedia content to devices 104*a*-104*d*. Continuing with the example above, before the communal viewing session begins, integration system 102*c* may request, from streaming application 402, a location of a manifest file including multimedia content for the communal viewing session. Streaming application 402 may provide information including, for example, a Uniform Resource Locator (URL) of the manifest file, the name of the manifest file and/or the file itself. Media fragments of, for example, three to six seconds of the multimedia content, may be stored in the manifest file. Based on resolution, each second of the media fragment may include, for example, twenty-four to sixty frames of full motion video and each frame may include a unique frame identifier. Before the communal session, synchronization system 102*b* may send the URL for the manifest file, via streaming application 402, to user devices 104*a*-104*d* participating in the communal session.

In addition to and/or in lieu of timestamp receipts transmitted to and from devices 104*a*-104*d*, synchronization system 102*b* may use the frame identifiers in the media fragments transmitted to and from devices 104*a*-104*d* to synchronize delivery of the media to devices 104*a*-104*d*. Consider, for example, that during the viewing session synchronization system 102*b* is to transmit a fragment with twenty-four frames, with each successive frame assigned an identifier from 1-24. Also consider that at time T1, synchronization system 102*b* is to transmit frames 1-10 to devices 104*a*-104*d*, and at time T2, synchronization system 102*b* is to transmit frames 11-20 to devices 104*a*-104*d*. Between T1 and T2 synchronization system 102*b* may receive frame identifier acknowledgements of the receipts of frames 1-10 from devices 104*a*-104*d*. If synchronization system 102*b* receives a frame identifier acknowledgement of the receipt of frames 1-10 from devices 104*a*-104*b*, and a frame identifier acknowledgement of the receipt of frames 1-7 from device 104*c*, and a frame identifier acknowledgement of the receipt of frames 1-8 from devices 104*d*, at T2, rather than send frames 8-10 to device 104*c* and frames 9 and 10 to device 104*d*, synchronization system 102*b* may transmit frames 11-20 to devices 104*a*-104*d*, thereby synchronizing delivery of the frames to devices 104*a*-104*b* with delivery of the frames to devices 104*c*-104*d*.

In some embodiments, at the start of the communal session, video player 404 may start to play the media fragments stored in the manifest file for host device 104*a* in an order determined, for example, by information obtained from the manifest file. At the start of the communal session in host device 104*a*, the video player may record a timestamp receipt for the start time, for example, in milliseconds or seconds, and may send the timestamp receipt and the frame number of the media fragment being played to synchronization system 102*b*. As the media is played in host device 104*a*, video player 404 may continuously send timestamp receipts and/or frame identifier acknowledgments of media fragment being played to synchronization system 102b. Synchronization system 102b may record the frame identifier acknowledgments, timestamp receipts, and/or the timestamp offset of host device 104a.

At the start of the communal session, video player 404 may also receive the start time for playing the media in user devices 104b-104d from synchronization system 102b. When the media playback starts, video player 404 may provide, to synchronization system 102b, a timestamp receipt of the start time of the media playback on each user device 104b-104d and the frame identifier acknowledgment of the media fragment(s) received by each user device 104b-104d. During the communal session, video player 404 may also provide the progress of the media playback on a predetermined basis for each user device 104b-104d to synchronization system 102b. Synchronization system 102b may review and compare the locations in the media being played on user devices 104a-104d on a pre-determined basis. Synchronization system 102b may continuously determine that the media being played on user devices 104a-104d are synchronized within a pre-determined period, for example, a pre-determined number of milliseconds or seconds. Synchronization system 102b may ensure that the media is synchronized on user devices 104a-104d by exchanging control messages with streaming application 402. Synchronization system 102b may dynamically adjust the pre-determined period to ensure the quality of the multimedia content. Synchronization system 102b may also ensure that the media being played on user devices 104b-104d is not ahead of the media being played on host device 104a.

Video player 404 may continuously send timestamp receipts and/or the frame identifier acknowledgments for fragment(s) played on each user device 104a-104d to synchronization system 102b. If the media being played on any of user devices 104a-104d falls behind a certain threshold, synchronization system 102b may provide signaling messages to streaming application 402. Synchronization system 102b may make necessary adjustments in transmitting the media to user devices 104a-104d, for example, either by instructing video player 404 to marginally slow the media being played to one or more devices or by accelerate the media being played to one or more devices, until all the devices are on the same frame. By making the necessary adjustments in transmitting the media to user devices 104a-104d, synchronization system 102b may ensure that the media is transmitted and played on all devices within acceptable tolerances.

If host device 104a rewinds the media being played on device 104a, the time offset associated with host device 104a and/or frame number associated with the content is adjusted continuously until host device 104a stops rewinding the media and playing the media resumes. Similarly, if host device 104a fast forwards the media being played on device 104a, the time offset and/or frame number is adjusted continuously until device 104a stops fast forwarding the media and playing the media resumes. The rewind or fast forward offset is sent to synchronization system 102b for adjustments of the transmissions on the other devices 104b-104d in the communal session. If host device 104a pauses the media being played on device 104a, a message is sent to synchronization system 102b and transmissions of the media is paused, such that a pause action on device 104a pauses playing of the media on all user devices 104b-104d at the same time.

In addition to performing initial configurations tests, including a speed test, on each user device 104a-104d to determine that the configuration of the user device meets the minimum network threshold at the start of a session, synchronization system 102b may perform periodic speed tests (for example, on an as needed basis or at predefined intervals) on each user device 104a-104d.

Figure 4:
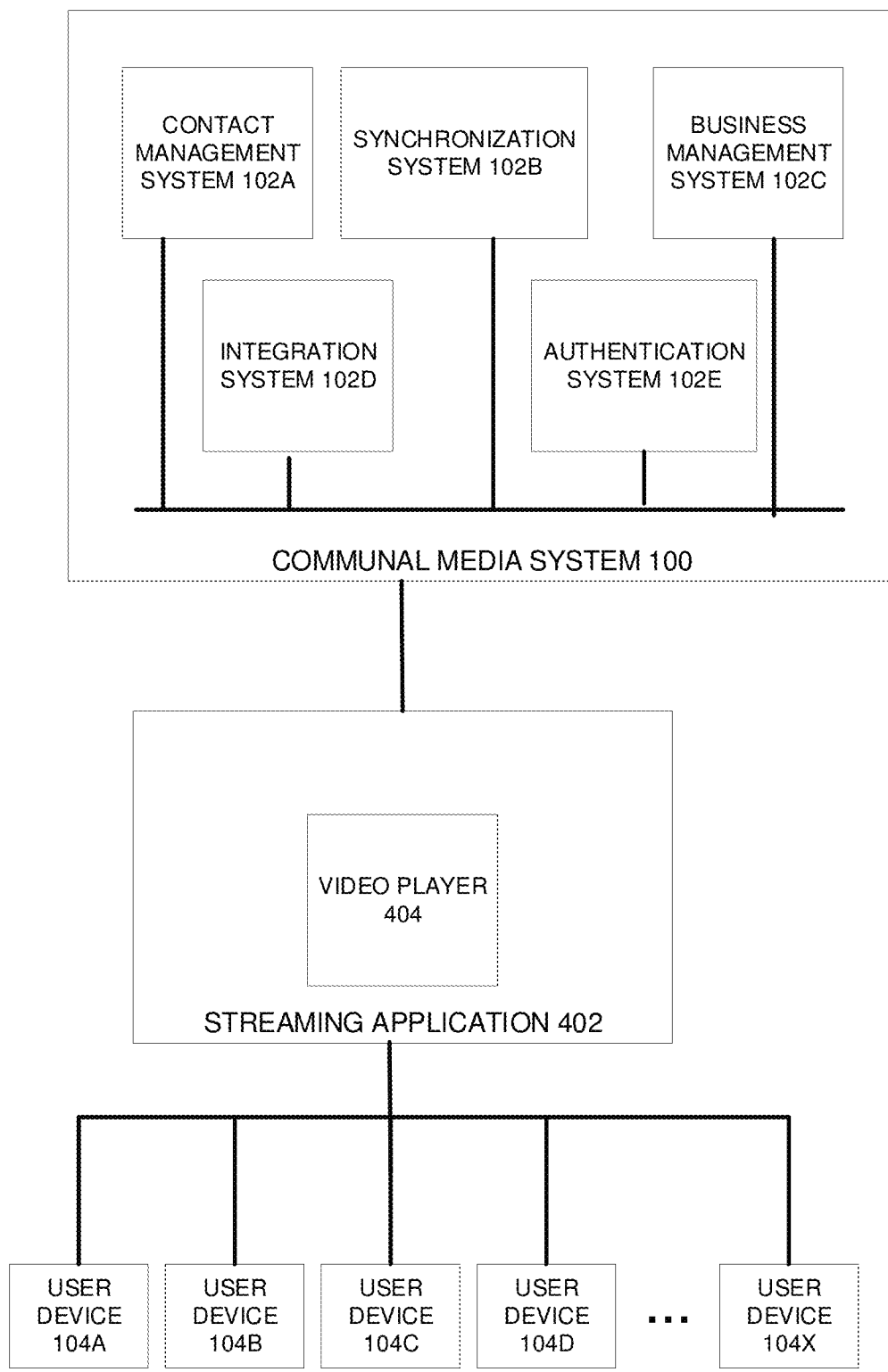
FIG. 4 is a block diagram of an overall system including a streaming application and a communal media system in accordance with some embodiments.

FIG. 4 is an overall block diagram of the communal media system integrated with a streaming application in accordance with some embodiments. Streaming application 402 is configured to communicate with multiple user devices 104 that are communicatively coupled to each other and with streaming application 402 and communal media system 100. Streaming application 402 may include one or more video players 404, each of which is configured to stream content transmitted from streaming application 402 to a user device 104.

Figure 5A:
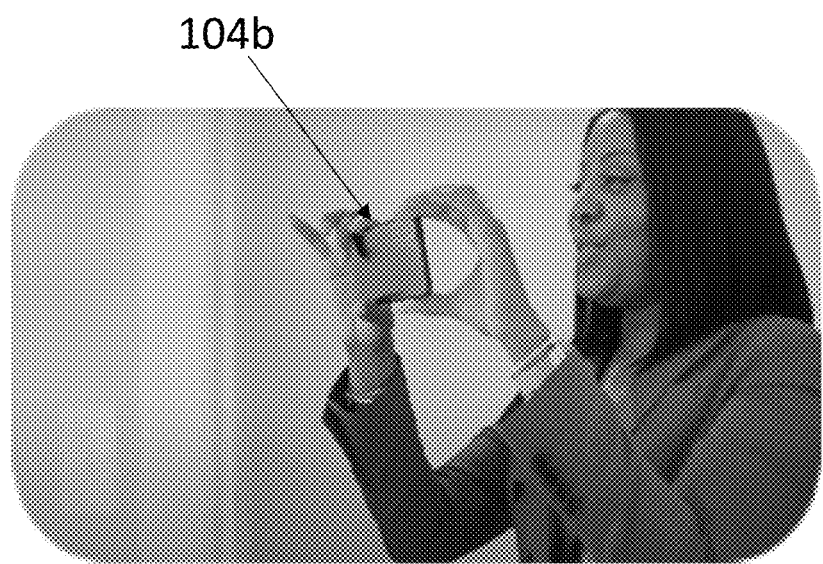
FIGS. 5A-5C show dual view sharing in accordance with some embodiments.
Figure 5B:
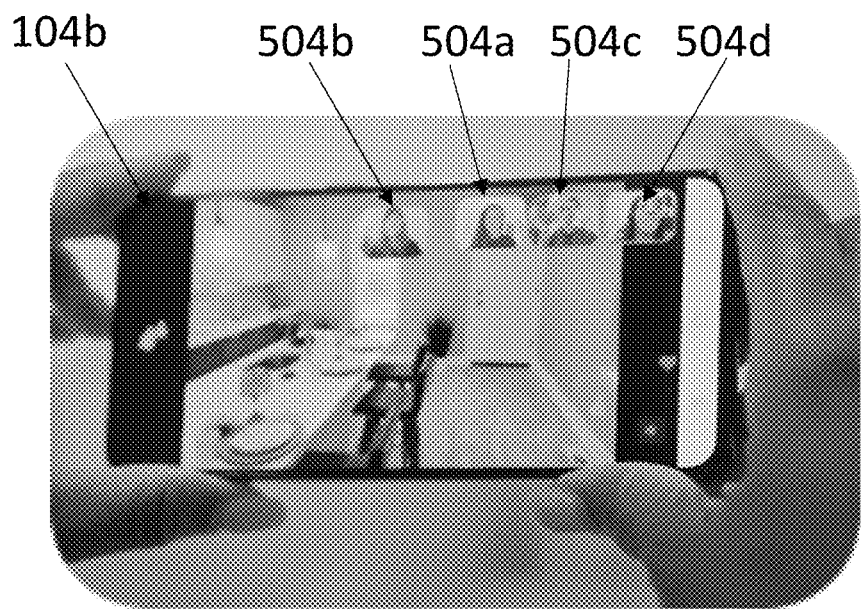
Figure 5C:
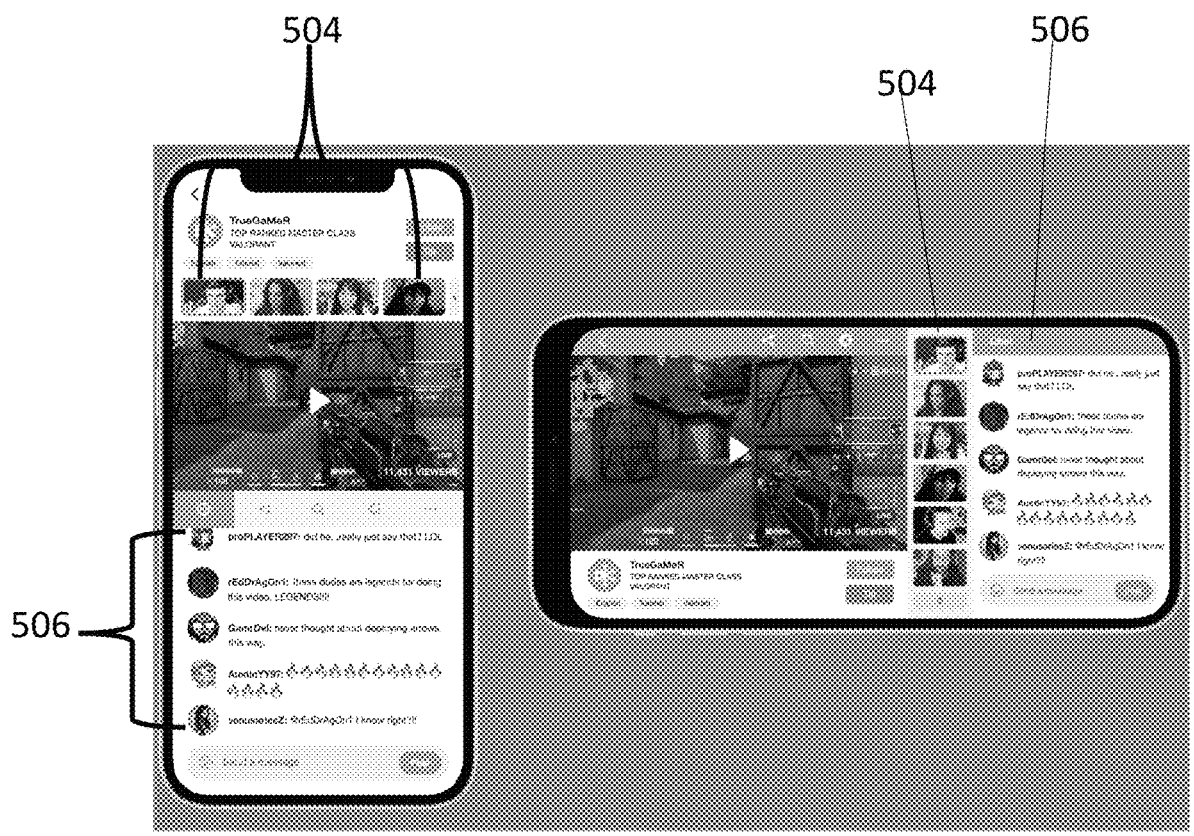

FIGS. 5A-5C show dual view sharing in accordance with some embodiments. Consider the example where devices 104a-104d are participating in a communal session, wherein devices 104a-104d are configured to simultaneously display multimedia content recorded by one of devices 104a-104d. In FIG. 5A, user device 104b captures a scene or live video on one or more cameras on the device.

In FIG. 5B, the recording captured by user device 104b is displayed on the screen of user device 104b, wherein as the recording is displayed on the screen of device 104b, it is simultaneously displayed on devices 104a, 104c-104e. Other cameras may also be simultaneously deployed by user device 104b and used in the communal session. For example, while one or more front cameras captures the scene on device 104b, the rear camera may be simultaneously deployed by user device 104b to capture an image (selfie) of the user of device 104b or another recording. The image captured by the rear camera on device 104b may be a live image of the user of device 104b and that image (with other social media activity) may be overlaid on or presented next to the live recording, from the front camera, in the communal session.

FIG. 5B shows the screen of device 104b, wherein the video captured by the front cameras of device 104b is displayed on the screen and avatars or images (504a, 504b, 504c, and 504d) representing users of each of devices 104a-104d is overlaid on or presented next to the recorded content on devices 104a-104e. By deploying two or more cameras (for example, the front and rear cameras) simultaneously, the user of device 104b can see both the group chatting session and view what is being recorded on device 104b at the same time. This dual view sharing capability helps the user of device 104b replicate an in-person viewing experience, thereby maintaining a personal connection during a communal session.

FIG. 5C. shows, in portrait and landscape views, that in addition to avatars/images 504 representing users of each device participating in the communal session, other social media content 506 generated by one or more of devices 104a-104d may also be overlaid on or presented next to the recorded content on devices 104a-104d. The images 504 may include live social media content including, for example, live video chats between the participants in the communal session.

Figure 6:
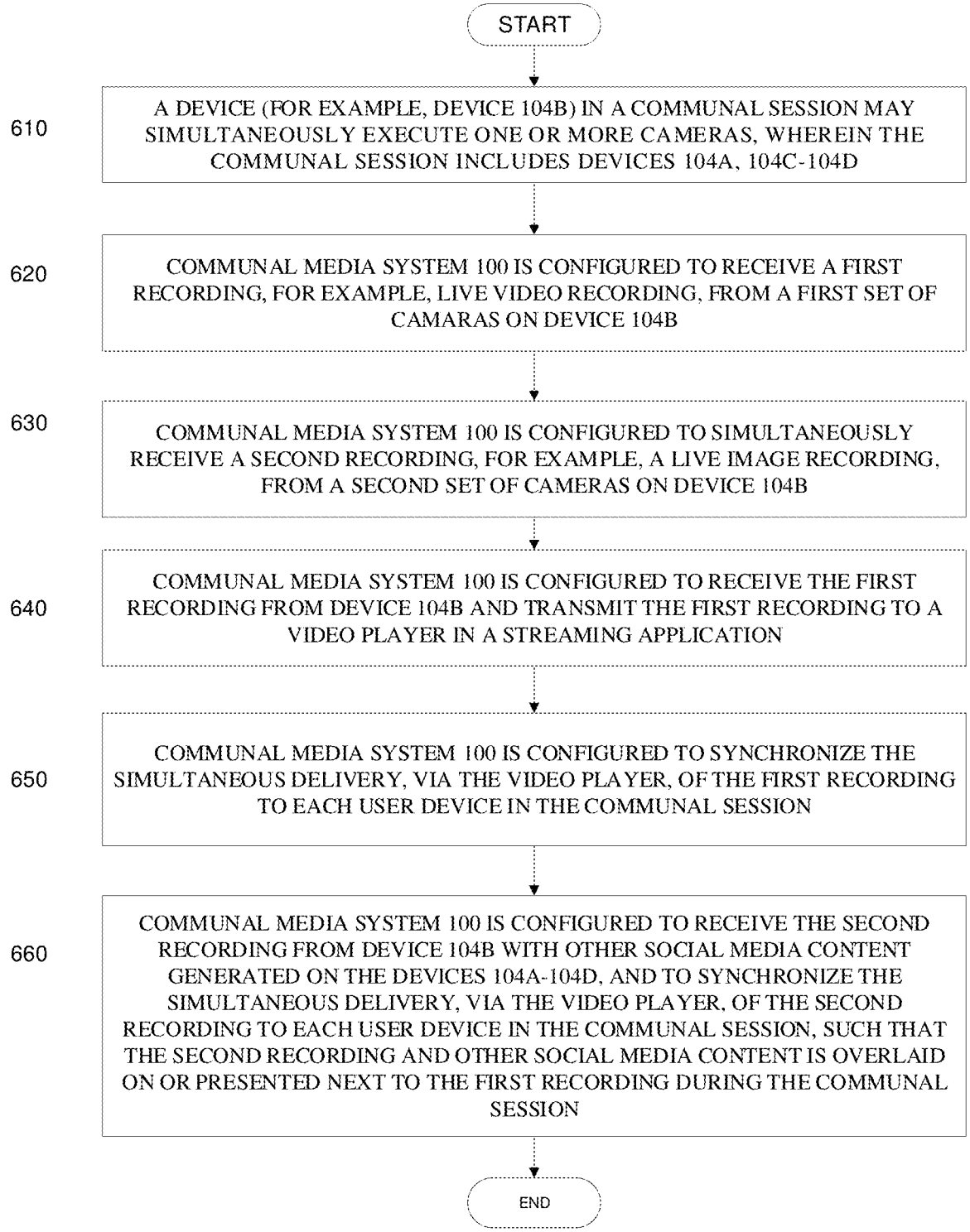
FIG. 6 is a flowchart of a method for authenticating user devices in a communal session via multiple service providers in accordance with some embodiments.

FIG. 6 is a flowchart of a method of dual view sharing in a communal session in accordance with some embodiments. At 610, a device (for example, device 104b) in a communal session may simultaneously execute one or more cameras, wherein the communal session includes devices 104a, 104c-104d. At 620, communal media system 100 is configured to receive a first recording from a first set of cameras on device 104*b*. For example, communal media system 100 may receive a live video recording from one or more front cameras of device 104*b*. At 630, communal media system 100 is configured to simultaneously receive a second recording from a second set of cameras on device 104*b*. For example, communal media system 100 may receive a live image recording of the user of device 104*b* from one or more rear cameras on device 104*b*. The first and second recordings may be generated simultaneously by device 104*b*.

At 640, communal media system 100 is configured to receive the first recording from device 104*b* and transmit the first recording to a video player in a streaming application. At 650, communal media system 100 is configured to synchronize the simultaneous delivery, via the video player, of the first recording to each user device in the communal session. At 660, communal media system 100 is configured to receive the second recording from device 104*b* with other social media content generated on the devices 104*a*-104*d*, and to synchronize the simultaneous delivery, via the video player, of the second recording to each user device in the communal session, such that the second recording and other social media content is overlaid on or presented next to the first recording during the communal session.

Figure 7:
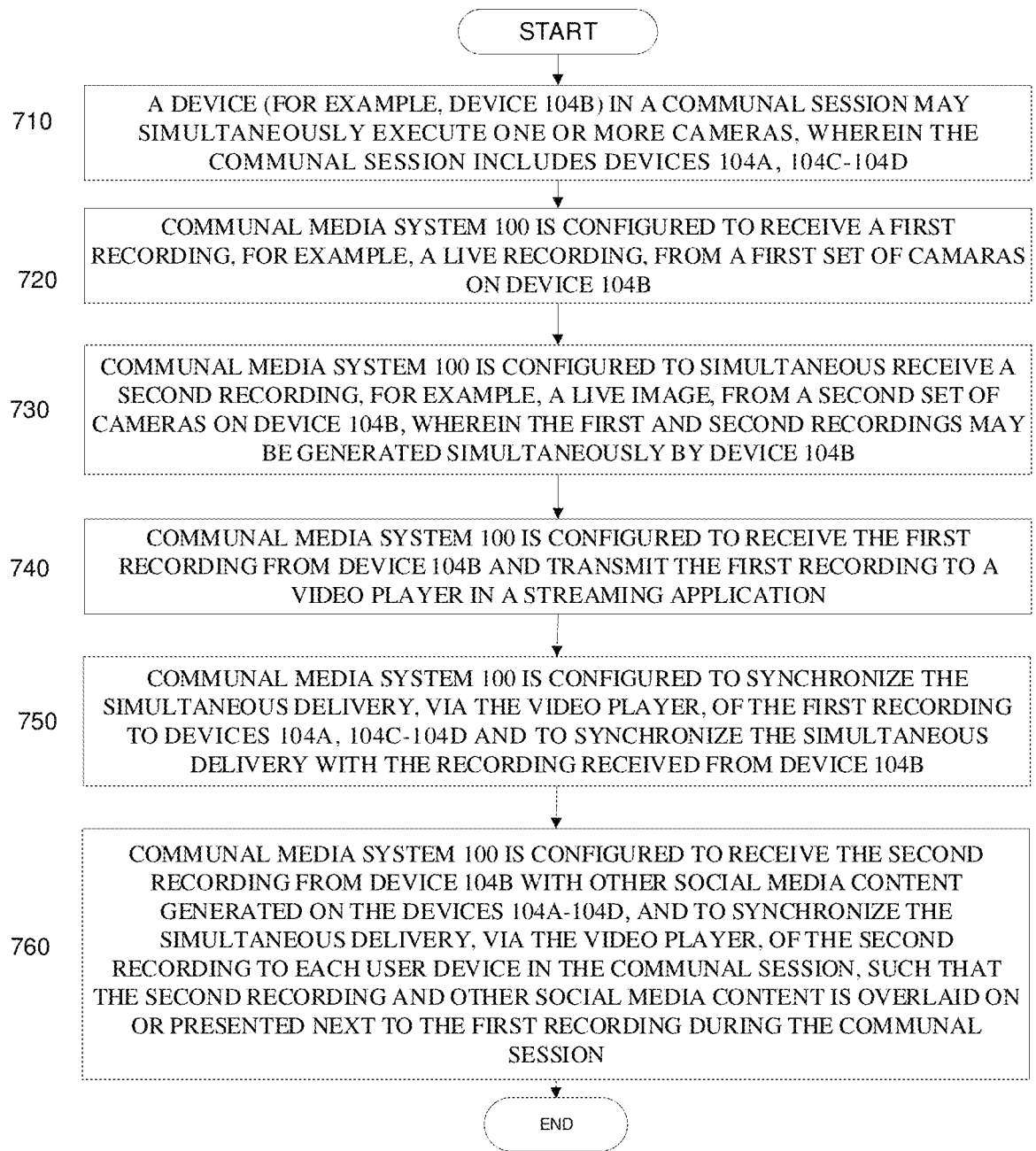
FIG. 7 is another flowchart of a method for authenticating user devices in a communal session via multiple service providers in accordance with some embodiments.

FIG. 7 is a flowchart of another method of dual view sharing in a communal session in accordance with some embodiments. At 710, a device (for example, device 104*b*) in a communal session may simultaneously execute one or more cameras, wherein the communal session includes devices 104*a*, 104*c*-104*d*. At 720, communal media system 100 is configured to receive a first recording from a first set of cameras on device 104*b*. For example, communal media system 100 may receive a live video recording from one or more front cameras of device 104*b*. At 730, communal media system 100 is configured to simultaneous receive a second recording from a second set of cameras on device 104*b*. For example, communal media system 100 may receive a live image recording of the user of device 104*b* from one or more rear cameras on device 104*b*. The first and second recordings may be generated simultaneously by device 104*b*.

At 740, communal media system 100 is configured to receive the first recording from device 104*b* and transmit the first recording to a video player in a streaming application. At 750, communal media system 100 is configured to synchronize the simultaneous delivery, via the video player, of the first recording to devices 104*a*, 104*c*-104*d* and to synchronize the simultaneous delivery with the recording received from device 104*b*. At 760, communal media system 100 is configured to receive the second recording from device 104*b* with other social media content generated on the devices 104*a*-104*d*, and to synchronize the simultaneous delivery, via the video player, of the second recording to each user device in the communal session, such that the second recording and other social media content is overlaid on or presented next to the first recording during the communal session.

Figure 8:
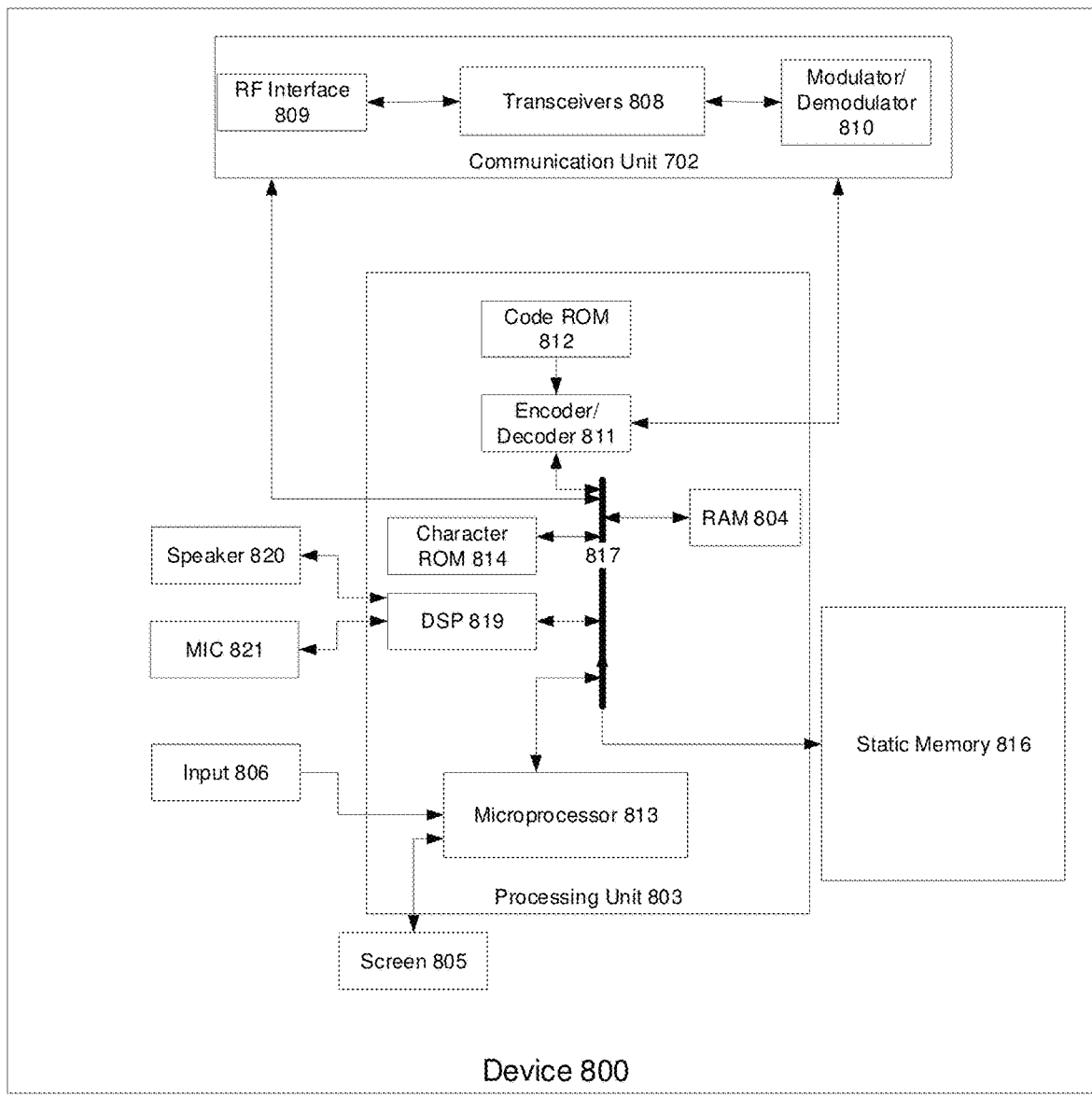
FIG. 8 is a block diagram of a user device used in accordance with some embodiments.

FIG. 8 is a block diagram of a user device 800, such as user device 104 of FIG. 1, used in accordance with some embodiments. User device 800 may include a communications unit 802 coupled to a common data and address bus 817 of a processor 803. Device 800 may also include an input unit (e.g., keypad, pointing device, etc.) 806, an output transducer unit (e.g., speaker) 820, an input transducer unit (e.g., a microphone) (MIC) 821, and a display screen 805, each coupled to be in communication with the processor 803.

The processor 803 may include, that is, implement, an encoder/decoder 811 with an associated code read-only memory (ROM) 812 for storing data for encoding and decoding voice, data, control, or other signals that may be transmitted or received by device 800. The processor 803 may further include one or more of a microprocessor 813 and digital signal processor (DSP) 819 coupled, by the common data and address bus 817, to the encoder/decoder 811 and to one or more memory devices, such as a ROM 814, a random access memory (RAM) 804, and a static or flash memory 816. One or more of ROM 814, RAM 804 and flash memory 816 may be included as part of processor 803 or may be separate from, and coupled to, the processor 803. The encoder/decoder 811 may be implemented by microprocessor 813 or DSP 819 or may be implemented by a separate component of the processor 803 and coupled to other components of the processor 803 via bus 818.

Communications unit 802 may include an RF interface 809 configurable to communicate with network components, and other user equipment within its communication range. Communications unit 802 may include one or more broadband and/or narrowband transceivers 808, such as a Long-Term Evolution (LTE) or 5G transceiver, a WiMAX transceiver perhaps operating in accordance with an IEEE 802.16 standard, and/or other similar type of wireless transceiver configurable to communicate via a wireless network for infrastructure communications. Communications unit 802 may also include one or more local area network or personal area network transceivers such as Wi-Fi transceiver perhaps operating in accordance with an IEEE 802.11 standard (e.g., 802.11a, 802.11b, 802.11g), or a Bluetooth transceiver. The transceivers may be coupled to a combined modulator/demodulator 810 that is coupled to the encoder/decoder 811.

The one or more memory devices 814, 816 may store code for decoding or encoding data such as control, request, or instruction messages, channel change messages, and/or data or voice messages that may be transmitted or received by device 800 and other programs and instructions that, when executed by the processor 803, provide for device 800 to perform the functions and operations described herein.

Figure 9:
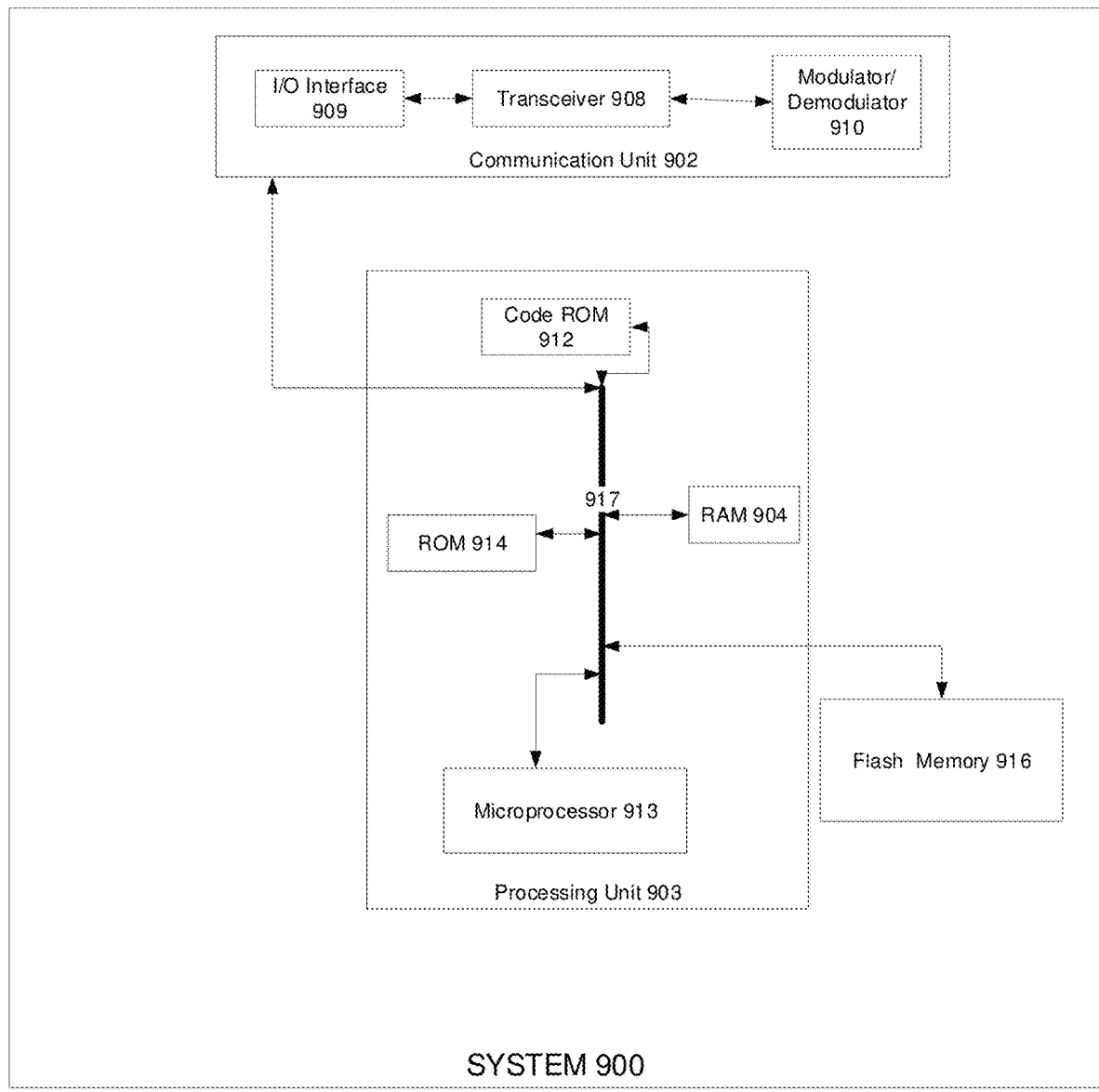
FIG. 9 is a block diagram of a system used in accordance with some embodiments.

FIG. 9 is a block diagram of a system 900, such as system 100 of FIG. 1, used in accordance with some embodiments. System 900, for example, may include a communications unit 902 coupled to a common data and address bus 917 of a processor 903. The processor 903 may include a code read-only memory (ROM) 912 for storing data for initializing system components of system 900. The processor 903 may further include a microprocessor 913 coupled, by the common data and address bus 917, to one or more memory devices, such as a read-only memory (ROM) 914, a random-access memory (RAM) 904, and/or a static or flash memory 916. One or more of ROM 914, RAM 904 and flash memory 916 may be included as part of processor 903 or may be separate from, and coupled to, the processor 903.

Communications unit 902 may include a wired or wireless input/output I/O interface 909 configurable to communicate with network components and other user equipment within its communication range. Communications unit 902 may include one or more broadband and/or narrowband transceivers 908, such as a Long-Term Evolution (LTE) transceiver and/or other similar type of wireless transceiver configurable to communicate via a wireless network for infrastructure communications. Communications unit 902 may also include one or more local area network or personal area network transceivers such as Wi-Fi transceiver perhaps operating in accordance with an IEEE 802.11 standard (e.g., 802.11a, 802.11b, 802.11g), or a Bluetooth transceiver. The transceivers may be coupled to a combined modulator/demodulator 910. The one or more memory devices 912, 914 and 916 are configured to store non-transitory computer-executable instructions to perform a set of functions such as described herein.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A communal media system, comprising:
an authentication system including a processor to authenticate access to multimedia content on a plurality of user devices participating in a communal session;
an integration system including a processor to integrate and communicatively couple the communal media system with a streaming application, wherein an initiator included within the streaming application executes the communal media system within the streaming application; and
a synchronization system including a processor to:
receive a first recording from a first user device in the communal session, the first recording being generated from a first set of cameras of the first user device,
to receive social media content generated on one or more of the plurality of user devices, the social media content including a second recording generated simultaneously with the first recording on the first user device, the second recording being generated from a second set of cameras of the first user device,
to initiate video playback on a player in the streaming application, the player being configured to transmit the first recording and the social media content to each of the plurality of user devices, and
to synchronize delivery of the first recording and the social media content, via the player, by exchanging playback control messages with the streaming application to direct synchronized transmissions of the first recording and the social media content from the player to each of the plurality of user devices, the first recording and the social media content being delivered to each of the plurality of user devices at a same time, without any noticeable lag time in delivery of the first recording and the social media content to each the plurality of user devices.

2. The communal media system of claim 1, wherein the first recording is a live video captured from the first set of cameras of the first user device.

3. The communal media system of claim 1, wherein the second recording is an image or video captured from the second set of cameras of the first user device.

4. The communal media system of claim 1, wherein the first set of cameras include one or more front cameras of the first user device.

5. The communal media system of claim 1, wherein the second set of cameras include one or more rear cameras of the first user device.

6. The communal media system of claim 1, wherein as the first recording is displayed on the first user device, the first recording is simultaneously displayed on each of the other plurality of user devices in the communal session.

7. The communal media system of claim 1, wherein the social media content is overlaid on or presented next to the first recording on each of the plurality of user devices.

8. A communal media system, comprising:
an authentication system including a processor to authenticate access to multimedia content on a plurality of user devices participating in a communal session;
an integration system including a processor to integrate and communicatively couple the communal media system with a streaming application, wherein an initiator included within the streaming application executes the communal media system within the streaming application; and
a synchronization system including a processor to:
receive a first recording from a first user device in the communal session, the first recording being generated from a first set of cameras of the first user device,
to receive social media content generated on one or more of the plurality of user devices, the social media content including a second recording generated simultaneously with the first recording on the first user device and content generated on one or more of the plurality of user devices, the second recording being generated from a second set of cameras of the first user device,
to initiate video playback on a player in the streaming application, the player being configured to transmit the first recording and the social media content to each of the plurality of user devices, and
to synchronize simultaneous delivery of the first recording, via the player, to each of the plurality of user devices except the first user device, to synchronize delivery of the second recording with the first recording received with the first user device, and to synchronize simultaneous delivery of the social media content, via the player, to each of the plurality of user devices, the first recording and the social media content being delivered to each of the plurality of user devices at a same time, without any noticeable lag time in delivery of the first recording and the social media content to each the plurality of user devices.

9. The communal media system of claim 8, wherein the synchronization system is configured to synchronize delivery of the first recording and the social media content by exchanging playback control messages with the streaming application to direct synchronized transmissions.

10. The communal media system of claim 8, wherein the social media content is overlaid on or presented next to the first recording on each of the plurality of user devices.

11. The communal media system of claim 1, wherein as the first recording is displayed on the first user device, the first recording is simultaneously displayed on each of the other plurality of user devices in the communal session.

12. A method for delivering multimedia content during a communal session at a communal media system communicatively coupled with a streaming application, comprising:
integrating and communicatively coupling the communal media system with the streaming application, wherein an initiator included within the streaming application executes the communal media system within the streaming application;
authenticating access to multimedia content for each of a plurality of user devices participating in a communal session;
receiving a first recording from a first user device in the communal session, the first recording being generated from a first set of cameras of the first user device;
receiving social media content generated on one or more of the plurality of user devices, the social media content including a second recording generated simultaneously with the first recording on the first user device, the second recording being generated from a second set of cameras of the first user device;
initiating video playback on a player in the streaming application, the player being configured to transmit the first recording and the social media content to each of the plurality of user devices; and
synchronizing delivery of the first recording and the social media content, via the player, by exchanging playback control messages with the streaming application to direct synchronized transmissions of the first recording and the social media content from the player to user devices, the first recording and the social media content being delivered to the user devices at a same time, without any noticeable lag time in delivery of the first recording and the social media content to the user devices.

13. The method of claim 12, wherein synchronizing comprises synchronizing simultaneous delivery of the first recording, via the player, to each of the plurality of user devices except the first user device and synchronizing delivery of the first recording with the first recording received with the first user device.

14. The method of claim 13, wherein further comprising displaying the first recording on each of the other plurality of user devices in the communal session as the first recording is simultaneously displayed on the first user device.

15. The method of claim 12, wherein synchronizing comprises synchronizing simultaneous delivery of the first recording, via the player, to each of the plurality of user devices.

16. The method of claim 12, wherein synchronizing comprises synchronizing simultaneous delivery of the social media content, via the player, to each of the plurality of user devices.

\* \* \* \* \*